(12) United States Patent
Wang et al.

(10) Patent No.: US 12,394,990 B2
(45) Date of Patent: Aug. 19, 2025

(54) METHOD AND SYSTEM FOR DYNAMIC STABILITY CONTROL OF POWER SYSTEMS WITH RENEWABLE ENERGY

(71) Applicants: ZHEJIANG UNIVERSITY, Hangzhou (CN); CHINA SOUTHERN POWER GRID CSG ELECTRIC POWER RESEARCH INSTITUTE, Guangzhou (CN)

(72) Inventors: Guoteng Wang, Hangzhou (CN); Wentao Liu, Hangzhou (CN); Ying Huang, Hangzhou (CN); Yan Li, Guangzhou (CN); Baorong Zhou, Guangzhou (CN); Ye Zhang, Guangzhou (CN); Wangqianyun Tang, Guangzhou (CN); Zheng Xu, Hangzhou (CN)

(73) Assignees: ZHEJIANG UNIVERSITY, Hangzhou (CN); CHINA SOUTHERN POWER GRID CSG ELECTRIC POWER RESEARCH INSTITUTE, Guangzhou (CN); China Southern Power Grid Co., Ltd., Guangzhou (CN)

( * ) Notice: Subject to any disclaimer, the term of this patent is extended or adjusted under 35 U.S.C. 154(b) by 0 days.

(21) Appl. No.: 18/924,248

(22) Filed: Oct. 23, 2024

(65) Prior Publication Data
US 2025/0047102 A1 Feb. 6, 2025

Related U.S. Application Data

(63) Continuation of application No. PCT/CN2024/109240, filed on Aug. 1, 2024.

(51) Int. Cl.
H02J 3/38 (2006.01)
H02J 3/00 (2006.01)

(52) U.S. Cl.
CPC .............. *H02J 3/381* (2013.01); *H02J 3/002* (2020.01); *H02J 2203/10* (2020.01); *H02J 2300/20* (2020.01)

(58) Field of Classification Search
CPC ...... H02J 3/381; H02J 3/38; H02J 3/00; H02J 3/002; H02J 2203/10; H02J 2300/20
See application file for complete search history.

(56) References Cited

U.S. PATENT DOCUMENTS

2022/0399719 A1   12/2022   Ma et al.

FOREIGN PATENT DOCUMENTS

| CN | 108377000 A | 8/2018 |
| CN | 115296331 A | 11/2022 |

(Continued)

*Primary Examiner* — Robert L Deberadinis (57) ABSTRACT

A dynamic stability control method for power systems with renewable energy, in which a non-linear system of a grid-forming inverter corresponding to a renewable energy power system is created. An external subsystem corresponding to the grid-forming inverter is constructed based on a Lie derivative. According to the external subsystem, a linear sliding surface corresponding to the external subsystem is constructed, and a dynamic stability control unit corresponding to the external subsystem is generated based on sliding mode control. A first instruction data corresponding to the dynamic stability control unit is generated to control dynamic stability of the renewable energy power system in real time. The voltage instruction value of the grid-forming inverter is modified to improve the dynamic stability of the renewable energy power system. A system for implementing such method is also provided.

12 Claims, 6 Drawing Sheets

(56) References Cited

FOREIGN PATENT DOCUMENTS

| | | |
|---|---|---|
| CN | 115940683 A | 4/2023 |
| CN | 116231724 A | 6/2023 |
| CN | 116316866 A | 6/2023 |
| CN | 117674071 A | 3/2024 |
| CN | 117895813 A | 4/2024 |

METHOD AND SYSTEM FOR DYNAMIC STABILITY CONTROL OF POWER SYSTEMS WITH RENEWABLE ENERGY

CROSS-REFERENCE TO RELATED APPLICATIONS

This application is a continuation of International Patent Application No. PCT/CN2024/109240, filed on Aug. 1, 2024. The content of the aforementioned application, including any intervening amendments thereto, is incorporated herein by reference in its entirety.

TECHNICAL FIELD

This application relates to power systems with renewable energy, and more particularly to a method and system for dynamic stability control of power systems with renewable energy.

BACKGROUND

In order to address more frequent occurrences of extreme weather conditions around the world in recent years, there is an urgent need to reduce the fossil energy consumption and carbon emission. Increasing the proportion of renewable energy in the primary energy supply is considered as an important way to reach the peak carbon dioxide emission and carbon neutralization. Renewable energy, such as solar energy and wind energy, is usually connected to a grid through an inverter. With an increase of the penetration of the renewable energy, a traditional power system dominated by synchronous generators are evolving into a power system dominated by the inverters. In order to achieve the zero carbon emission, the establishment of power systems with 100% renewable energy (PSRE) is regarded as an ultimate goal of smart grid evolution. Extensive attempts have been made to study the PSRE. Under the current planning and operation conditions, it is possible to achieve the energy balance in the PSRE. However, the PSRE will eliminate synchronous generators to become a complete power electronic-based power system completely composed of the inverters, which would bring great challenges to the control of dynamic stability of the PSRE.

In the power system dominated by synchronous generators, its dynamic stability is maintained by a power system stabilizer. In the design of the power system stabilizer, an auxiliary signal is appended to a reference voltage in an excitation system, so as to provide a damping torque for the synchronous generator at an oscillation frequency. Such method improves the dynamic stability of the power system with almost no negative effects, and has been widely adopted in the synchronous generator-dominated power systems. The structure of the power system stabilizer is determined according to analysis results of a Heffron-Phillips model of the synchronous generator, and considering the huge difference of operation characteristics between the inverter and the synchronous generator, the structure of the power system stabilizer cannot be fully applicable to the inverter.

Therefore, it is urgent to design and develop a method and system for dynamic stability control of power systems with renewable energy to address the above technical defects.

SUMMARY

To overcome the above defects and difficulties of the prior art, this application provides a method and system for dynamic stability control of power systems with renewable energy, so as to enhance dynamic stability of the power systems with renewable energy through modifying a voltage instruction value of an inverter.

A first object of this application is to provide a method for dynamic stability control of a renewable energy power system. A second object of this application is to provide a system for dynamic stability control of the renewable energy power system.

In a first aspect, this application provides a method for dynamic stability control of a renewable energy power system, comprising:

(1) creating a non-linear system of a grid-forming inverter corresponding to the renewable energy power system; and constructing an external subsystem corresponding to the grid-forming inverter based on a Lie derivative;

(2) constructing a linear sliding surface corresponding to the external subsystem; and generating a dynamic stability control unit corresponding to the external subsystem based on a sliding mode control; and (3) generating a first instruction data corresponding to the dynamic stability control unit, and according to the first instruction data, controlling dynamic stability of the renewable energy power system in real time; wherein the first instruction data is a voltage instruction value data.

In an embodiment, in step (1), the non-linear system is created through steps of:

creating at least three control loops corresponding to the non-linear system of the grid-forming inverter, wherein the at least three control loops comprise a virtual synchronization loop, a current inner loop and an outer loop;

constructing an inner loop current controller corresponding to the current inner loop and an outer loop controller corresponding to the outer loop; and obtaining a voltage reference value data and a power angle variation data corresponding to the grid-forming inverter, and constructing a non-linear single-input single-output (SISO) model corresponding to the grid-forming inverter.

In an embodiment, step (1) further comprises:

constructing a positive sequence and fundamental frequency model corresponding to the non-linear system of the grid-forming inverter, wherein the positive sequence and fundamental frequency model is expressed as:

$$\begin{cases} \dfrac{di_{sd}}{dt} = \dfrac{1}{L_{arm}}(-u_{sd} + v_d + \omega L_{arm} i_{sq} - R_{arm} i_{sd}) \\ \dfrac{di_{sq}}{dt} = \dfrac{1}{L_{arm}}(-u_{sq} + v_q - \omega L_{arm} i_{sd} - R_{arm} i_{sq}) \end{cases} \quad (1)$$

wherein $v_d$ denotes a d-axis output of an inner loop controller, and $v_q$ denotes a q-axis output of the inner loop controller; $R_{arm}$ denotes a resistance of a bridge arm, and $L_{arm}$ denotes an inductance of the bridge arm; $u_{sd}$ denotes a d-axis component of a bus voltage, and $u_{sq}$ denote a q-axis component of the bus voltage; $i_{sd}$ denotes a d-axis component of an output current of the grid-forming inverter, and $i_{sq}$ denotes a q-axis component of the output current of the grid-forming inverter; and $\omega$ denotes a fundamental frequency of the grid-forming inverter.

In an embodiment, the non-linear SISO model is expressed as:

$$\begin{cases} \dot{x} = f + gu \\ y = h(x) \end{cases} \quad (2)$$

$$\begin{cases} x = [\Delta\delta, \Delta\omega, i_{sd}, i_{sq}, M_{id}, M_{iq}, M_{Us}, M_{uq}]^T \\ f = \begin{bmatrix} \omega_0 \Delta\omega \\ -\dfrac{1}{2H_m}\Delta P_s - \dfrac{D_m}{2H_m}\Delta\omega \\ \dfrac{1}{L_{arm}}[-k_{pid}k_{pUs}u_{sd} - (k_{pid}+R_{arm})i_{sd} + M_{id} + k_{pid}M_{Us}] \\ \dfrac{1}{L_{arm}}[-k_{pid}k_{puq}u_{sq} - (k_{piq}+R_{arm})i_{sq} + M_{iq} + k_{piq}M_{uq}] \\ -k_{iid}k_{pUs}u_{sd} - k_{iid}i_{sd} + k_{iid}M_{Us} \\ -k_{iiq}k_{puq}u_{sq} - k_{iiq}i_{sq} + k_{iiq}M_{uq} \\ -k_{iUs}u_{sd} - k_{iUs}U_{sref} \\ -k_{iuq}u_{sq} \end{bmatrix} \\ g = \left[0, 0, \dfrac{k_{pid}k_{pUs}}{L_{arm}}, 0, k_{iid}k_{pUs}, 0, k_{iUs}, 0\right] \\ h = \Delta\delta \\ u = U_{sref} \end{cases}$$

wherein $\Delta\omega$ denotes a rotating speed of the grid-forming inverter, and $\Delta\delta$ denotes a power angle variation of the grid-forming inverter; $i_{sd}$ denotes a d-axis component of an output current of the grid-forming inverter, and $i_{sq}$ denotes a q-axis component of the output current of the grid-forming inverter; $M_{id}$ denotes an integral variable of a d-axis part of the inner loop current controller, and $M_{iq}$ denotes an integral variable of a q-axis part of the inner loop current controller; $M_{us}$ denotes an integral variable of a d-axis part of the outer loop controller, and $M_{uq}$ denotes an integral variable of a q-axis part of the outer loop controller; $\omega_0$ denotes a reference frequency; $H_m$ denotes an inertia coefficient of the grid-forming inverter, and $D_m$ denotes a damping coefficient of the grid-forming inverter; $\Delta P_s$ denotes a power variation of the grid-forming inverter; $R_{arm}$ denotes the resistance of the bridge arm, and $L_{arm}$ denotes the inductance of the bridge arm; $k_{pid}$ denotes a proportional coefficient of the d-axis part of the inner loop current controller, and $k_{iid}$ denotes an integral coefficient of the d-axis part of the inner loop current controller; $k_{piq}$ denotes a proportional coefficient of the q-axis part of the inner loop current controller, and $k_{iiq}$ denotes an integral coefficient of the q-axis part of the inner loop current controller; u denotes an input signal; $U_{sref}$ denotes a bus voltage reference value of the grid-forming inverter; $k_{pUs}$ denotes a proportional coefficient of the d-axis part of the outer loop controller, and $k_{iUs}$ denotes an integral coefficient of the d-axis part of the outer loop controller; $k_{puq}$ denotes a proportional coefficient of the q-axis part of the outer loop controller, and $k_{iuq}$ denotes an integral coefficient of the q-axis part of the outer loop controller; $u_{sd}$ denotes a d-axis component of inverter-based generation (IBG) bus voltage, and $u_{sq}$ denotes a q-axis component of the IBG output voltage; and y denotes an output signal.

In an embodiment, step (2) further comprises:
generating a hybrid reaching law corresponding to the linear sliding surface based on the linear sliding surface; and
according to the hybrid reaching law, generating an input signal data of the grid-forming inverter corresponding to the non-linear system of the grid-forming inverter.

In an embodiment, the method further comprises:
after step (3), generating a fault data corresponding to the renewable energy power system; and verifying the dynamic stability of the renewable energy power system in real time based on the fault data.

The second object of this application is realized as follows. The system for dynamic stability control is implemented for the method above, and the control system comprises:
a creation unit;
a data construction unit; and
a data generation unit;
wherein the creation unit is configured for creating the non-linear system of the grid-forming inverter corresponding to the renewable energy power system, and constructing the external subsystem corresponding to the grid-forming inverter based on the Lie derivative;
the data construction unit is configured for constructing the linear sliding surface corresponding to the external subsystem, and generating the dynamic stability control unit corresponding to the external subsystem based on sliding mode control; and
the data generation unit is configured for generating the first instruction data corresponding to the dynamic stability control unit, and controlling the dynamic stability of the renewable energy power system in real time according to the first instruction data; wherein the first instruction data is the voltage instruction value data.

In an embodiment, the creation unit comprises:
a first creation module;
a second creation module; and
a third creation module;
wherein the first creation module is configured for creating at least three control loops corresponding to the non-linear system of the grid-forming inverter, wherein the at least three control loops comprise the virtual synchronization loop, the current inner loop and the outer loop;
the second creation module is configured for constructing the inner loop current controller corresponding to the current inner loop, and the outer loop controller corresponding to the outer loop; and
the third creation module is configured for obtaining the voltage reference value data and the power angle variation data corresponding to the grid-forming inverter, and constructing the non-linear SISO model corresponding to the grid-forming inverter.

In an embodiment, the data construction unit comprises:
a first generation module; and
a second generation module;
wherein the first generation module is configured for generating the hybrid reaching law corresponding to the linear sliding surface based on the linear sliding surface; and
the second generation module is configured for generating the input signal data of the grid-forming inverter corresponding to the non-linear system of the grid-forming inverter according to the hybrid reaching law.

In an embodiment, the control system further comprises:
a generation and verification module;
wherein the generation and verification module is configured for generating the fault data corresponding to the renewable energy power system, and verifying the dynamic stability of the renewable energy power system in real time based on the fault data.

In an embodiment, the creation unit further comprises:
a fourth creation module;
wherein the fourth creation module is configured for constructing the positive sequence and fundamental frequency model corresponding to the non-linear system of the grid-forming inverter, wherein the positive sequence and fundamental frequency model is expressed as:

$$\begin{cases} \dfrac{di_{sd}}{dt} = \dfrac{1}{L_{arm}}(-u_{sd} + v_d + \omega L_{arm} i_{sq} - R_{arm} i_{sd}) \\ \dfrac{di_{sq}}{dt} = \dfrac{1}{L_{arm}}(-u_{sq} + v_q - \omega L_{arm} i_{sd} - R_{arm} i_{sq}) \end{cases} \quad (1)$$

wherein $v_d$ denotes the d-axis output of the inner loop controller, and $v_q$ denotes the q-axis output of the inner loop controller; $R_{arm}$ denotes the resistance of the bridge arm, and $L_{arm}$ denotes the inductance of the bridge arm; $u_{sd}$ denotes a d-axis component of a bus voltage, and $u_{sq}$ denote a q-axis component of the bus voltage; $i_{sd}$ denotes a d-axis component of an output current of the grid-forming inverter, and $i_{sq}$ denotes a q-axis component of the output current of the grid-forming inverter; and $\omega$ denotes the fundamental frequency of the grid-forming inverter.

In an embodiment, in the third creation module, the non-linear SISO model is expressed as:

$$\begin{cases} \dot{x} = f + gu \\ y = h(x) \end{cases} \quad (2)$$

$$\begin{cases} x = [\Delta\delta, \Delta\omega, i_{sd}, i_{sq}, M_{id}, M_{iq}, M_{Us}, M_{uq}]^T \\ f = \begin{bmatrix} \omega_0 \Delta\omega \\ -\dfrac{1}{2H_m}\Delta P_s - \dfrac{D_m}{2H_m}\Delta\omega \\ \dfrac{1}{L_{arm}}[-k_{pid}k_{pUs}u_{sd} - (k_{pid} + R_{arm})i_{sd} + M_{id} + k_{pid}M_{Us}] \\ \dfrac{1}{L_{arm}}[-k_{pid}k_{puq}u_{sq} - (k_{piq} + R_{arm})i_{sq} + M_{iq} + k_{piq}M_{uq}] \\ -k_{iid}k_{pUs}u_{sd} - k_{iid}i_{sd} + k_{iid}M_{Us} \\ -k_{iiq}k_{puq}u_{sq} - k_{iiq}i_{sq} + k_{iiq}M_{uq} \\ -k_{iUs}u_{sd} - k_{iUs}U_{sref} \\ -k_{iuq}u_{sq} \end{bmatrix} \\ g = \left[0, 0, \dfrac{k_{pid}k_{pUs}}{L_{arm}}, 0, k_{iid}k_{pUs}, 0, k_{iUs}, 0\right] \\ h = \Delta\delta \\ u = U_{sref} \end{cases}$$

wherein $\Delta\omega$ denotes the rotating speed of the grid-forming inverter, and $\Delta\delta$ denotes the power angle variation of the grid-forming inverter; $i_{sd}$ denotes the d-axis component of the output current of the grid-forming inverter, and $i_{sq}$ denotes the q-axis component of the output current of the grid-forming inverter; $M_{id}$ denotes the integral variable of the d-axis part of the inner loop current controller, and $M_{iq}$ denotes the integral variable of the q-axis part of the inner loop current controller; $M_{Us}$ denotes the integral variable of the d-axis part of the outer loop controller, and $M_{uq}$ denotes the integral variable of the q-axis part of the outer loop controller; $\omega_0$ denotes the reference frequency; $H_m$ denotes the inertia coefficient of the grid-forming inverter, and $D_m$ denotes the damping coefficient of the grid-forming inverter; $\Delta P_s$ denotes the power variation of the grid-forming inverter; $R_{arm}$ denotes the resistance of the bridge arm, and $L_{arm}$ denotes the inductance of the bridge arm; $k_{pId}$ denotes the proportional coefficient of the d-axis part of the inner loop current controller, and $k_{iid}$ denotes the integral coefficient of the d-axis part of the inner loop current controller; $k_{piq}$ denotes the proportional coefficient of the q-axis part of the inner loop current controller, and $k_{iiq}$ denotes the integral coefficient of the q-axis part of the inner loop current controller; u denotes the input signal; $U_{sref}$ denotes the bus voltage reference value of the grid-forming inverter; $k_{pUs}$ denotes the proportional coefficient of the d-axis part of the outer loop controller, and $k_{iUs}$ denotes the integral coefficient of the d-axis part of the outer loop controller; $k_{puq}$ denotes the proportional coefficient of the q-axis part of the outer loop controller, and $k_{iuq}$ denotes the integral coefficient of the q-axis part of the outer loop controller; $u_{sd}$ denotes a d-axis component of IBG bus voltage, and $u_{sq}$ denotes a q-axis component of the IBG output voltage; and y denotes the output signal.

This application, through the above method, creates the non-linear system of the grid-forming inverter corresponding to the renewable energy power system, and constructs the external subsystem corresponding to the grid-forming inverter based on the Lie derivative; constructs the linear sliding surface corresponding to the grid-forming inverter according to the external subsystem, and generates the dynamic stability control unit corresponding to the grid-forming inverter based on the sliding mode control; and generates and obtains the first instruction data corresponding to the dynamic stability control unit, and controls the dynamic stability of the renewable energy power system in real time according to the first instruction data; wherein the first instruction data is the voltage instruction value data. In addition, this application provides the system corresponding to the method, so as to modify the voltage instruction value of the grid-forming inverter to improve the dynamic stability of the renewable energy power system.

That is, through technical solutions of this application, the external subsystem of the renewable energy power system is constructed, and analytical expressions of signal control of the grid-forming inverter are derived based on the sliding mode control, so as to improve the dynamic stability of the renewable energy power system through modifying the voltage instruction value of the grid-forming inverter.

BRIEF DESCRIPTION OF THE DRAWINGS

To illustrate the technical solutions of the embodiments of this application more clearly, the accompanying drawings required in the description of the embodiments will be briefly introduced below. It is obvious that the following accompanying drawings only show some embodiments of this application, and for those of ordinary skill in the art, other accompanying drawings can also be obtained according to these drawings without making creative effort.

The realization of the objects, functional characteristics and advantages of the present disclosure will be further described combined with the embodiments with reference to the accompanying drawings.

DETAILED DESCRIPTION OF EMBODIMENTS

In order to illustrate the objects, technical solutions and advantages of embodiments of this application more clearly, the embodiments of this application will be further described below with reference to the accompanying drawings. Those of ordinary skill in the art can easily understand other advantages and functions of this application from the disclosure of this description.

This application can also be implemented or applied by other different specific embodiments. In addition, various details in this description can be modified and changed based on different perspectives and applications without departing from the spirit of the present disclosure.

It should be noted that the terms, such as "up", "down", "left", "right", "front", "rear" and other directional indications used herein, are only used for illustrating relative position relationship and motion between components in a specific state (as shown in the accompanying drawings). If the specific state changes, the directional indication accordingly changes.

In addition, the terms "first" and "second" are only used for distinguishment rather than indicating or implying the relative importance or implicitly specifying the number of technical features indicated. Therefore, a feature defined with "first" or "second" may explicitly or implicitly indicates the inclusion of at least one of such features. Besides, technical solutions of individual embodiments can be combined with each other as long as the combined solution can be implemented by those skilled in the art. When a combination of the technical solutions is contradictory or cannot be realized, it should be considered that such a combination does not exist, and is not within the scope of the present disclosure.

This application will be further described below with reference to the accompanying drawings. Referring to FIGS. 1-5, this application provides a method for dynamic stability control of a renewable energy power system, and the method includes the following steps.

Figure 5:
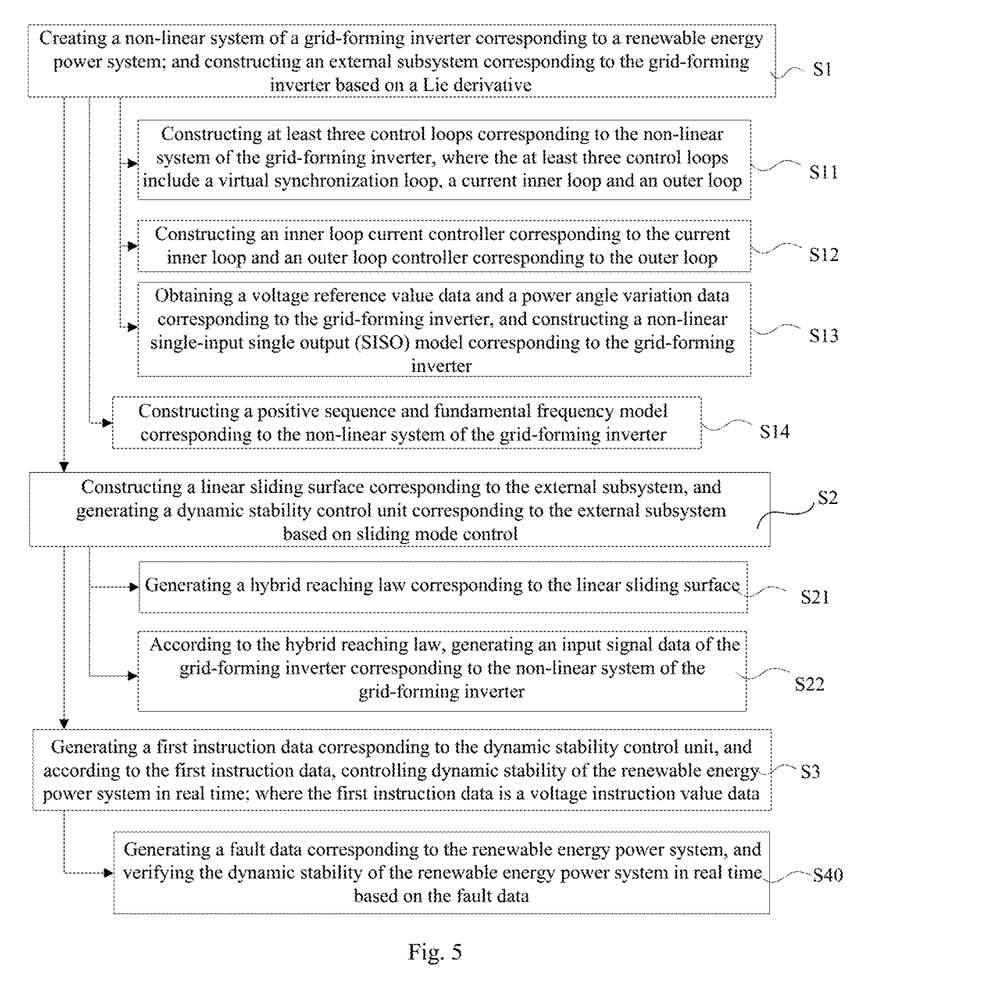
FIG. 5 is a flow chart of the method according to an embodiment of the present disclosure.

(S1) A non-linear system of a grid-forming inverter corresponding to the renewable energy power system is created, and an external subsystem corresponding to the grid-forming inverter is constructed based on a Lie derivative.

(S2) A linear sliding surface corresponding to the external subsystem is constructed, and a dynamic stability control unit corresponding to the external subsystem is generated based on a sliding mode control.

(S3) A first instruction data corresponding to the dynamic stability control unit is generated, and according to the first instruction data, dynamic stability of the renewable energy power system is controlled in real time, where the first instruction data is a voltage instruction value data.

In an embodiment, in step (S1), the non-linear system is created through the following steps.

(S11) At least three control loops corresponding to the non-linear system of the grid-forming inverter are created, where the at least three control loops include a virtual synchronization loop, a current inner loop and an outer loop.

(S12) An inner loop current controller corresponding to the current inner loop and an outer loop controller corresponding to the outer loop are constructed.

(S13) A voltage reference value data and a power angle variation data corresponding to the grid-forming inverter are obtained, and a non-linear single-input single-output (SISO) model corresponding to the grid-forming inverter is constructed.

In an embodiment, step (S1) further includes the following steps.

(S14) A positive sequence and fundamental frequency model corresponding to the non-linear system of the grid-forming inverter is constructed, where the positive sequence and fundamental frequency model is expressed as:

$$\begin{cases} \dfrac{di_{sd}}{dt} = \dfrac{1}{L_{arm}}(-u_{sd} + v_d + \omega L_{arm} i_{sq} - R_{arm} i_{sd}) \\ \dfrac{di_{sq}}{dt} = \dfrac{1}{L_{arm}}(-u_{sq} + v_q - \omega L_{arm} i_{sd} - R_{arm} i_{sq}) \end{cases} \quad (1)$$

where $v_d$ denotes a d-axis output of an inner loop controller, and $v_q$ denotes a q-axis output of the inner loop controller; $R_{arm}$ denotes a resistance of a bridge arm, and $L_{arm}$ denotes an inductance of the bridge arm; $u_{sd}$ denotes a d-axis component of a bus voltage, and $u_{sq}$ denote a q-axis component of the bus voltage; $i_{sd}$ denotes a d-axis component of an output current of the grid-forming inverter, and $i_{sq}$ denotes a q-axis component of the output current of the grid-forming inverter; and $\omega$ denotes a fundamental frequency of the grid-forming inverter.

The non-linear SISO model is expressed as:

$$\begin{cases} \dot{x} = f + gu \\ y = h(x) \end{cases}, \quad f = \begin{bmatrix} \omega_0 \Delta\omega \\ -\dfrac{1}{2H_m}\Delta P_s - \dfrac{D_m}{2H_m}\Delta\omega \\ \dfrac{1}{L_{arm}}[-k_{pid}k_{pUs}u_{sd} - (k_{pid} + R_{arm})i_{sd} + M_{id} + k_{pid}M_{Us}] \\ \dfrac{1}{L_{arm}}[-k_{pid}k_{puq}u_{sq} - (k_{piq} + R_{arm})i_{sq} + M_{iq} + k_{piq}M_{uq}] \\ -k_{iid}k_{pUs}u_{sd} - k_{iid}i_{sd} + k_{iid}M_{Us} \\ -k_{iiq}k_{puq}u_{sq} - k_{iiq}i_{sq} + k_{iiq}M_{uq} \\ -k_{iUs}u_{sd} - k_{iUs}U_{sref} \\ -k_{iuq}u_{sq} \end{bmatrix}; \quad x = [\Delta\delta, \Delta\omega, i_{sd}, i_{sq}, M_{id}, M_{iq}, M_{Us}, M_{uq}]^T \quad (2)$$

$$g = \left[0, 0, \dfrac{k_{pid}k_{pUs}}{L_{arm}}, 0, k_{iid}k_{pUs}, 0, k_{iUs}, 0\right]$$

$$h = \Delta\delta$$

$$u = U_{sref}$$

where $\Delta\omega$ denotes a rotating speed of the grid-forming inverter, and $\Delta\delta$ denotes a power angle variation of the grid-forming inverter; $i_{sd}$ denotes a d-axis component of an output current of the grid-forming inverter, and $i_{sq}$ denotes a q-axis component of the output current of the grid-forming inverter; $M_{id}$ denotes an integral variable of a d-axis part of the inner loop current controller, and $M_{iq}$ denotes an integral variable of a q-axis part of the inner loop current controller; $M_{Us}$ denotes an integral variable of a d-axis part of the outer loop controller, and $M_{uq}$ denotes an integral variable of a q-axis part of the outer loop controller; $\omega_0$ denotes a reference frequency; $H_m$ denotes an inertia coefficient of the grid-forming inverter, and $D_m$ denotes a damping coefficient of the grid-forming inverter; $\Delta P_s$ denotes a power variation of the grid-forming inverter; $R_{arm}$ denotes the resistance of the bridge arm, and $L_{arm}$ denotes the inductance of the bridge arm; $k_{pid}$ denotes a proportional coefficient of the d-axis part of the inner loop current controller, and $k_{iid}$ denotes an integral coefficient of the d-axis part of the inner loop current controller; $k_{piq}$ denotes a proportional coefficient of the q-axis part of the inner loop current controller, and $k_{iiq}$ denotes an integral coefficient of the q-axis part of the inner loop current controller; u denotes an input signal; $U_{sref}$ denotes a bus voltage reference value of the grid-forming inverter;

dynamic stability of the renewable energy power system is verified in real time based on the fault data.

In an embodiment, this application provides a method for dynamic stability control of a 100% renewable energy power system including the following steps. First, an external subsystem model of the grid-forming inverter is obtained through input-output linearization, and expressions of the external subsystem are derived by using the Lie derivative, so that a hybrid reaching law of the sliding surface is proposed. In addition, this application further provides a dynamic stability controller of the grid-forming inverter based on the hybrid reaching law of the sliding surface.

The method for dynamic stability control of a 100% renewable energy power system includes the following steps.

(1) A non-linear system standard form of the grid-forming inverter is derived.

(2) The expressions of the external subsystem are derived by using the Lie derivative.

(3) The hybrid reaching law of the sliding surface is proposed.

(4) The dynamic stability controller of the grid-forming inverter is obtained based on the sliding mode control.

In step (1), the non-linear system standard form of the grid-forming inverter is obtained by the following formulas:

$$\begin{cases} \dot{x} = f + gu \\ y = h(x) \end{cases}, \quad \begin{cases} x = [\Delta\delta, \Delta\omega, i_{sd}, i_{sq}, M_{id}, M_{iq}, M_{Us}, M_{uq}]^T \\ f = \begin{bmatrix} \omega_0 \Delta\omega \\ -\frac{1}{2H_m}\Delta P_s - \frac{D_m}{2H_m}\Delta\omega \\ \frac{1}{L_{arm}}[-k_{pid}k_{pUs}u_{sd} - (k_{pid} + R_{arm})i_{sd} + M_{id} + k_{pid}M_{Us}] \\ \frac{1}{L_{arm}}[-k_{pid}k_{puq}u_{sq} - (k_{piq} + R_{arm})i_{sq} + M_{iq} + k_{piq}M_{uq}] \\ -k_{iid}k_{pUs}u_{sd} - k_{iid}i_{sd} + k_{iid}M_{Us} \\ -k_{iiq}k_{puq}u_{sq} - k_{iiq}i_{sq} + k_{iiq}M_{uq} \\ -k_{iUs}u_{sd} - k_{iUs}U_{sref} \\ -k_{iuq}u_{sq} \end{bmatrix} \\ g = \left[0, 0, \frac{k_{pid}k_{pUs}}{L_{arm}}, 0, k_{iid}k_{pUs}, 0, k_{iUs}, 0\right] \\ h = \Delta\delta \\ u = U_{sref} \end{cases} \quad (2)$$

$k_{pUs}$ denotes a proportional coefficient of a d-axis part of the outer loop controller, and $k_{iUs}$ denotes an integral coefficient of the d-axis part of the outer loop controller; $k_{puq}$ denotes a proportional coefficient of the q-axis part of the outer loop controller, and $k_{iuq}$ denotes an integral coefficient of the q-axis part of the outer loop controller; $u_{sd}$ denotes a d-axis component of inverter-based generation (IBG) bus voltage, and $u_{sq}$ denotes a q-axis component of the IBG output voltage; and y denotes an output signal.

In an embodiment, step (S2) includes the following steps.

(S21) A hybrid reaching law corresponding to the linear sliding surface is generated based on the linear sliding surface.

(S22) According to the hybrid reaching law, an input signal data of the grid-forming inverter corresponding to the non-linear system of the grid-forming inverter is generated.

In an embodiment, the method further includes the following step.

(S40) After step (S3), a fault data corresponding to the renewable energy power system is generated, and the where $\Delta\omega$ denotes the rotating speed of the grid-forming inverter, and $\Delta\delta$ denotes the power angle variation of the grid-forming inverter; $i_{sd}$ denotes the d-axis component of the output current of the grid-forming inverter, and $i_{sq}$ denotes the q-axis component of the output current of the grid-forming inverter; $M_{id}$ denotes the integral variable of the d-axis part of the inner loop current controller, and $M_{iq}$ denotes the integral variable of the q-axis part of the inner loop current controller; $M_{Us}$ denotes the integral variable of the d-axis part of the outer loop controller, and $M_{uq}$ denotes the integral variable of the q-axis part of the outer loop controller; $\omega_0$ denotes the reference frequency; $H_m$ denotes the inertia coefficient of the grid-forming inverter, and $D_m$ denotes the damping coefficient of the grid-forming inverter; $\Delta P_s$ denotes the power variation of the grid-forming inverter; $R_{arm}$ denotes the resistance of the bridge arm, and $L_{arm}$ denotes the inductance of the bridge arm; $k_{pid}$ denotes the proportional coefficient of the d-axis part of the inner loop current controller, and $k_{iid}$ denotes the integral coefficient of the d-axis part of the inner loop current controller; $k_{piq}$ denotes the proportional coefficient of the q-axis part of the inner loop current controller, and $k_{iiq}$ denotes the integral coefficient of the q-axis part of the inner loop current controller; u denotes the input signal; $U_{sref}$ denotes the bus voltage reference value of the grid-forming inverter; $k_{pUs}$ denotes the proportional coefficient of the d-axis part of the outer loop controller, and $k_{iUs}$ denotes the integral coefficient of the d-axis part of the outer loop controller; $k_{puq}$ denotes the proportional coefficient of the q-axis part of the outer loop controller, and $k_{iuq}$ denotes the integral coefficient of the q-axis part of the outer loop controller; $u_{sd}$ denotes the d-axis component of IBG bus voltage, and $u_{sq}$ denotes the q-axis component of the IBG output voltage; and y denotes the output signal.

In step (2), the expressions of the external subsystem are obtained by the following formulas:

$$\begin{cases} \dot{\zeta}_1 = \zeta_2 \\ \dot{\zeta}_2 = \zeta_3 \\ \dot{\zeta}_3 = L_f^3 y + L_g L_f^2 y U_{sref} \end{cases} \quad (3)$$

where $\zeta_i$ denotes an external subsystem variable; $L_f^3 y$ denotes a third Lie derivative of the output signal y with respect to a system function f; $L_g L_f^2 y$ denotes a third Lie derivative of the output signal y with respect to an input function g.

In step (3), the hybrid reaching law of the sliding surface is proposed by the following formulas:

$$\dot{v} = -k|v|^\alpha v - \varepsilon |v|^\beta sat(v); \; v = \lambda_1 \zeta_1 + \lambda_2 \zeta_2 + \zeta_3; sat(v) = \begin{cases} \text{sign}(v), & |v| > \Gamma \\ \frac{v}{\Gamma}, & |v| \le \Gamma \end{cases}; \quad (4)$$

where $\lambda_1$ denotes a constant coefficient, and $\lambda_2$ denotes a constant coefficient; v denotes the sliding surface; $\alpha > 1$, $0 < \beta < 1$, and $\alpha$, $\beta$, k and $\varepsilon$ are constant coefficients; sat( ) denotes a saturation function; $\Gamma$ denotes a thickness of a boundary layer, and $0 < \Gamma < 1$; when $|v| > \Gamma$, a power term would accelerate the system to approach the sliding mode; when $|v| < \Gamma$, the saturation function is controlled by adopting linear feedback in the boundary layer, so as to achieve smooth transition and weaken system buffeting.

In the step (4), the dynamic stability controller of the grid-forming inverter is obtained by the following formula:

$$U_{sref} = \frac{-k|v|^\alpha v - \varepsilon |v|^\beta sat(v) - \lambda_1 \zeta_2 - \lambda_2 \zeta_3 - L_f^3 y}{L_g L_f^2 y}. \quad (5)$$

In other words, the technical solutions of the present disclosure provide the method for dynamic stability control of the renewable energy power systems, including the following steps.

(1) The non-linear system standard form of the grid-forming inverter is derived as follows.

Figure 1:
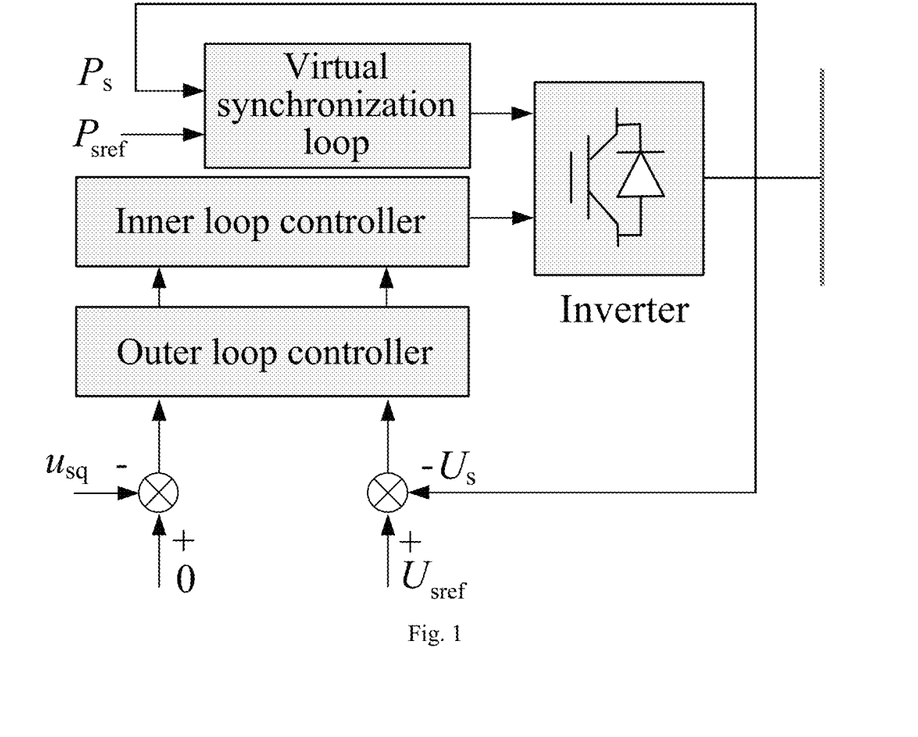
FIG. 1 is a schematic diagram of an inverter model of a method for dynamic stability control of a renewable energy power system according to an embodiment of the present disclosure.

A model of the grid-forming inverter is shown in FIG. 1, and the dynamic stability controller of the grid-forming inverter includes three control loops, which are the virtual synchronization loop, the inner loop and the outer loop. In the FIG. 1, $P_s$ denotes an actual value of an active power output, and $P_{sref}$ denotes a reference value of the active power output; $U_s$ denote a bus voltage actual value, and $U_{sref}$ denotes the bus voltage reference value; and $u_{sq}$ denotes a q-axis component of the bus voltage.

The positive sequence and fundamental frequency model of the grid-forming inverter is constructed as follows:

$$\begin{cases} \frac{di_{sd}}{dt} = \frac{1}{L_{arm}}(-u_{sd} + v_d + \omega L_{arm} i_{sq} - R_{arm} i_{sd}) \\ \frac{di_{sq}}{dt} = \frac{1}{L_{arm}}(-u_{sq} + v_q - \omega L_{arm} i_{sd} - R_{arm} i_{sq}) \end{cases} ; \quad (1)$$

where $v_d$ denotes the d-axis output of the inner loop controller, and $v_q$ denotes the q-axis output of the inner loop controller; $R_{arm}$ denotes the resistance of the bridge arm, and $L_{arm}$ denotes the inductance of the bridge arm; $u_{sd}$ denotes the d-axis component of the bus voltage, and $u_{sq}$ denote the q-axis component of the bus voltage; $i_{sd}$ denotes the d-axis component of the output current of the grid-forming inverter, and $i_{sq}$ denotes the q-axis component of the output current of the grid-forming inverter; and $\omega$ denotes the fundamental frequency of the grid-forming inverter.

A modulation process is ignored, and a model of the inner loop controller of the grid-forming inverter is expressed as:

$$\begin{cases} v_d = u_{sd} - \omega L_{arm} i_{sq} + [k_{pid}(i_{sdref} - i_{sd}) + M_{id}] \\ v_q = u_{sq}\omega + L_{arm} i_{sd} + [k_{piq}(i_{sqref} - i_{sq}) + M_{iq}] \end{cases}; \text{ and} \quad (6)$$

$$\begin{cases} \frac{dM_{id}}{dt} = k_{iid}(i_{sdref} - i_{sd}) \\ \frac{dM_{iq}}{dt} = k_{iiq}(i_{sqref} - i_{sq}) \end{cases}; \quad (7)$$

where $M_{id}$ denotes the integral variable of the d-axis part of the inner loop current controller, and $M_{iq}$ denotes the integral variable of the q-axis part of the inner loop current controller; $k_{pid}$ denotes the proportional coefficient of the d-axis part of the inner loop current controller, and $k_{iid}$ denotes the integral coefficient of the d-axis part of the inner loop current controller; $k_{piq}$ denotes the proportional coefficient of the q-axis part of the inner loop current controller, and $k_{iiq}$ denotes the integral coefficient of the q-axis part of the inner loop current controller; and $i_{sdref}$ denotes a d-axis part of the current reference, and $i_{sqref}$ denotes q-axis current reference.

A model of the outer loop controller of the grid-forming inverter is expressed as:

$$\begin{cases} i_{sdref} = (U_{sref} - u_{sd})k_{pUs} + M_{Us} \\ i_{sqref} = -u_{sq}k_{puq} + M_{Uq} \end{cases}; \text{ and} \quad (8)$$

$$\begin{cases} \frac{dM_{Us}}{dt} = k_{iUs}(U_{sref} - u_{sd}) \\ \frac{dM_{uq}}{dt} = -k_{iuq}u_{sq} \end{cases}; \quad (9)$$

where $U_{sref}$ denotes the bus voltage reference value of the grid-forming inverter; $k_{pUs}$ denotes the proportional coefficient of the d-axis part of the outer loop controller, and $k_{iUs}$ denotes the integral coefficient of the d-axis part of the outer loop controller; $k_{puq}$ denotes the proportional coefficient of the q-axis part of the outer loop controller, and $k_{iuq}$ denotes the integral coefficient of the q-axis part of the outer loop controller; and $M_{Us}$ denotes the integral variable of the d-axis part of the outer loop controller, and $M_{uq}$ denotes the integral variable of the q-axis part of the outer loop controller.

The output voltage reference value of the grid-forming inverter $U_{sref}$ is selected as an input, and the power angle variation $\Delta\delta$ is selected as an output, and the non-linear SISO model is expressed as:

$$\begin{cases} \dot{x} = f + gu \\ y = h(x) \end{cases}, \begin{cases} x = [\Delta\delta, \Delta\omega, i_{sd}, i_{sq}, M_{id}, M_{iq}, M_{Us}, M_{uq}]^T \\ f = \begin{bmatrix} \omega_0 \Delta\omega \\ -\dfrac{1}{2H_m}\Delta P_s - \dfrac{D_m}{2H_m}\Delta\omega \\ \dfrac{1}{L_{arm}}[-k_{pid}k_{pUs}u_{sd} - (k_{pid} + R_{arm})i_{sd} + M_{id} + k_{pid}M_{Us}] \\ \dfrac{1}{L_{arm}}[-k_{pid}k_{puq}u_{sq} - (k_{piq} + R_{arm})i_{sq} + M_{iq} + k_{piq}M_{uq}] \\ -k_{iid}k_{pUs}u_{sd} - k_{iid}i_{sd} + k_{iid}M_{Us} \\ -k_{iiq}k_{puq}u_{sq} - k_{iiq}i_{sq} + k_{iiq}M_{uq} \\ -k_{iUs}u_{sd} - k_{iUs}U_{sref} \\ -k_{iuq}u_{sq} \end{bmatrix} \\ g = \left[0, 0, \dfrac{k_{pid}k_{pUs}}{L_{arm}}, 0, k_{iid}k_{pUs}, 0, k_{iUs}, 0\right] \\ h = \Delta\delta \\ u = U_{sref} \end{cases} \quad (2)$$

(2) The expressions of the external subsystem are derived by using the Lie derivative.

The output signal y is written as a Lie derivative form as:

$$\dot{y} = L_f y + L_g y U_{sref}. \quad (10)$$

Since $L_g y = 0$, a second Lie derivative of the output signal y is:

$$\ddot{y} = L_f^2 y + L_g L_f y U_{sref}. \quad (11)$$

Here, $L_g L_f y$ is still 0, and a third Lie derivative of the output signal y is derived as:

$$\dddot{y} = L_f^3 h(x) + L_g L_f^2 h(x) U_{sref}. \quad (12)$$

Here, $L_g L_f^2 h(x)$ is no longer 0, and a third-order external subsystem of an original system is obtained by using an input-output linearization method, and is expressed as:

$$\begin{cases} \dot{\zeta}_1 = \zeta_2 \\ \dot{\zeta}_2 = \zeta_3 \\ \dot{\zeta}_3 = L_f^3 y + L_g L_f^2 y U_{sref} \end{cases} ; \quad (3)$$

where $\zeta_i$ denotes the external subsystem variable and is expressed as:

$$\begin{cases} \zeta_1 = \Delta\delta \\ \zeta_2 = \omega_0 \Delta\omega \\ \zeta_3 = -\dfrac{\omega_0}{2H_m}\Delta P_s - \omega_0 \dfrac{D_m}{2H_m}\Delta\omega \end{cases} ; \quad (13)$$

$$L_f^3 y = \dfrac{\partial L_f^2 y}{\partial \Delta\delta}\dfrac{\partial \Delta\delta}{\partial t} + \dfrac{\partial L_f^2 y}{\partial \Delta\omega}\dfrac{\partial \Delta\omega}{\partial t} + \dfrac{\partial L_f^2 y}{\partial i_{sd}}\dfrac{\partial i_{sd}}{\partial t} + \dfrac{\partial L_f^2 y}{\partial i_{sq}}\dfrac{\partial i_{sq}}{\partial t} + \quad (14)$$

-continued $$\dfrac{\partial L_f^2 y}{\partial i_{sd}^2}\dfrac{\partial i_{sd}}{\partial t} + \dfrac{\partial L_f^2 y}{\partial i_{sq}^2}\dfrac{\partial i_{sq}}{\partial t};$$

and $$L_g L_f^2 y = \dfrac{\partial L_f^2 y}{\partial i_{sd}}\dfrac{k_{pid}k_{pUs}}{L_{arm}}; \quad (15)$$

where terms above are expressed as:

$$\dfrac{\partial L_f^2 h(x)}{\partial \Delta\delta} = -\dfrac{\omega_0}{2H_m}\dfrac{\partial P_s}{\partial \Delta\delta}; \quad (16)$$

$$\dfrac{\partial L_f^2 y}{\partial \Delta\omega} = -\dfrac{D_m}{2H_m}; \quad (17)$$

$$\dfrac{\partial L_f^2 h(x)}{\partial i_{sd}} = -\dfrac{\omega_0}{2H_m}\dfrac{\partial \Delta P_s}{\partial i_{sd}}; \quad (18)$$

$$\dfrac{\partial L_f^2 y}{\partial i_{sq}} = -\dfrac{\omega_0}{2H_m}\dfrac{\partial \Delta P_s}{\partial i_{sq}}; \quad (19)$$

$$\dfrac{\partial \Delta P_s}{\partial i_{sd}} = U_{inf}\cos\delta_s + 2R_s i_{sd} \quad (20)\text{-}(21)$$

$$\dfrac{\partial \Delta P_s}{\partial i_{sq}} = -U_{inf}\sin\delta_s + 2R_s i_{sq} \quad ; \text{ and}$$

an expression of $L_f^2 y$ is expressed as:

$$L_f^2 y = -\dfrac{\omega_o}{2H_m}\Delta P_s - \dfrac{D_m}{2H_m}\Delta\omega. \quad (22)$$

The hybrid reaching law of the sliding surface is proposed.

In view of the third-order external subsystem, the linear sliding surface is expressed as:

$$v = \lambda_1 \zeta_1 + \lambda_2 \zeta_2 + \zeta_3; \quad (23)$$

$\zeta_1$ tends to 0 after a system trajectory approaches the sliding surface, where v=0 on the sliding surface, and the system moves on the sliding surface and satisfies:

$$\ddot{\zeta}_1 + \lambda_2 \dot{\zeta}_1 + \lambda_1 \zeta_1 = 0. \quad (24)$$

A natural frequency and a damping coefficient of $\zeta_1$ motion are expressed as:

$$\begin{cases} \omega_n = \sqrt{\lambda_1} \\ \varsigma = \dfrac{\lambda_2}{2\sqrt{\lambda_1}} \end{cases}; \quad (25)$$

where $\omega_n$ denotes the natural frequency when $\zeta_1$ is moving on the sliding surface; $\varsigma$ denotes the damping coefficient when $\zeta_1$ is moving on the sliding surface; and $\lambda_1$ and $\lambda_2$ can be determined by using selecting the natural frequency and the damping coefficient.

A derivative of v satisfies:

$$\dot{v} = \lambda_1 \zeta_2 + \lambda_2 \zeta_3 + L_f^3 y + L_g L_f^2 y U_{sref}. \quad (26)$$

To ensure that the system trajectory reaches the sliding surface faster and ensure a motion smoothness near the sliding surface, a new hybrid reaching law is proposed as:

$$\dot{v} = -k|v|^\alpha v - \varepsilon |v|^\beta sat(v); \quad (27)$$

where $\alpha$, $\beta$, k and $\varepsilon$ are constant coefficients, $\alpha > 1$, and $0 \ll 1$.

sat( ) denotes the saturation function, and is expressed as:

$$sat(v) = \begin{cases} sign(v), & |v| > \Gamma \\ \dfrac{v}{\Gamma}, & |v| \le \Gamma \end{cases}; \quad (28)$$

where $\Gamma$ denotes the thickness of the boundary layer, and $0 < \Gamma < 1$; when $|v| > \Gamma$, the power term would accelerate the system to approach the sliding mode; when $|v| < \Gamma$, the saturation function is controlled by adopting linear feedback in the boundary layer, so as to achieve smooth transition and weaken system buffeting.

(4) The dynamic stability controller of the grid-forming inverter is obtained based on the sliding mode control.

According to the derivative of v and the hybrid reaching law, their relationship is expressed as:

$$\lambda_1 \zeta_2 + \lambda_2 \zeta_3 + L_f^3 y + L_g L_f^2 y U_{sref} = -k|v|^\alpha v - \varepsilon |v|^\beta sat(v). \quad (29)$$

According to the hybrid reaching law, the input signal data of the grid-forming inverter is expressed as:

$$U_{sref} = \dfrac{-k|v|^\alpha v - \varepsilon |v|^\beta sat(v) - \lambda_1 \zeta_2 - \lambda_2 \zeta_3 - L_f^3 h(x)}{L_g L_f^2 h(x)}. \quad (5)$$

(5) Verification is performed.

Figure 2:
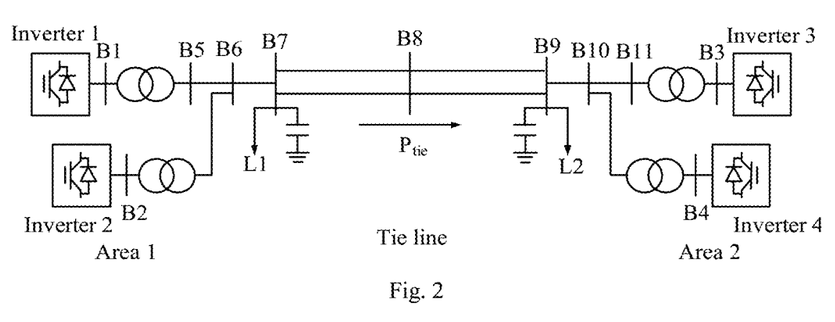
FIG. 2 is a schematic diagram of an IEEE 11-bus system with 100% renewable energy of the dynamic stability control method according to an embodiment of the present disclosure.
Figure 3:
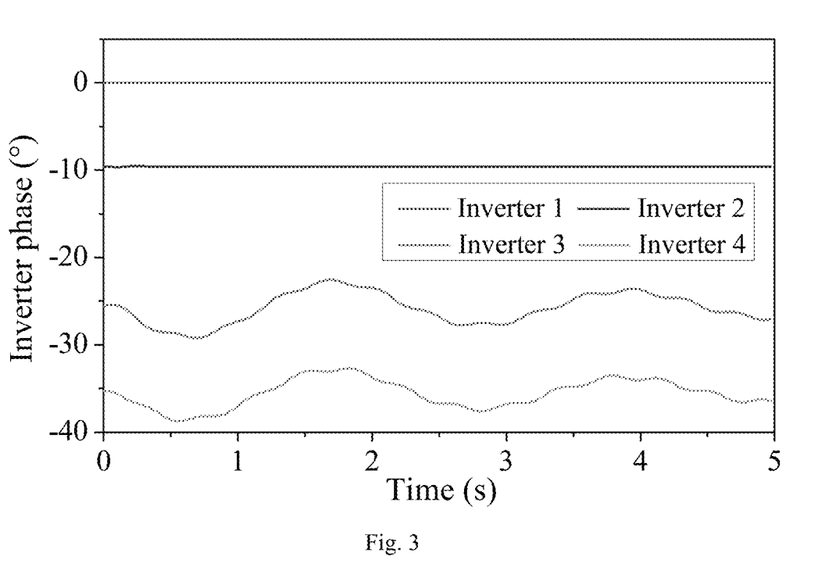
FIG. 3 is a schematic diagram of an oscillation phenomenon of the renewable energy power system before an application of the dynamic stability control method according to an embodiment of the present disclosure.
Figure 4:
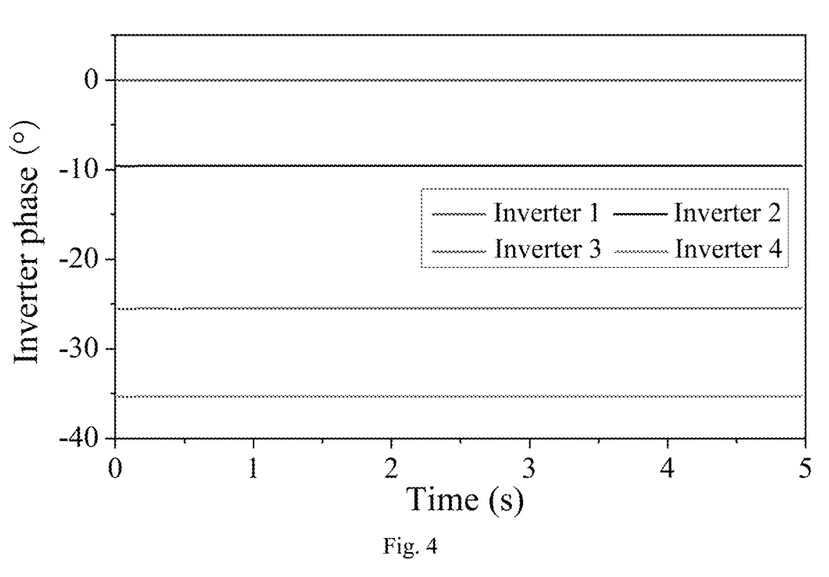
FIG. 4 is a schematic diagram of stability results after the application of the method according to an embodiment of the present disclosure.

The verification is performed in a modified Institute of Electrical and Electronics Engineers (IEEE) 11-bus system, where each of original four synchronous generators are replaced with the grid-forming inverter, and an original output are constant, and a tie line between two areas has doubled in size. A topological structure of the modified IEEE 11-bus system is shown in FIG. 2. Before the dynamic stability control method is applied, a small disturbance is applied to obtain response curves of individual grid-forming inverters as shown in FIG. 3. As observed from FIG. 3, individual units of the modified IEEE 11-bus system oscillate and are in dynamic instability. After applying the dynamic stability control method, a same fault is applied to obtain response curves of individual grid-forming inverters as shown in FIG. 4. As observed from comparison between the FIG. 3 with FIG. 4, the method for dynamic stability control can effectively improve a dynamic stability of the 100% renewable energy power system.

Figure 6:
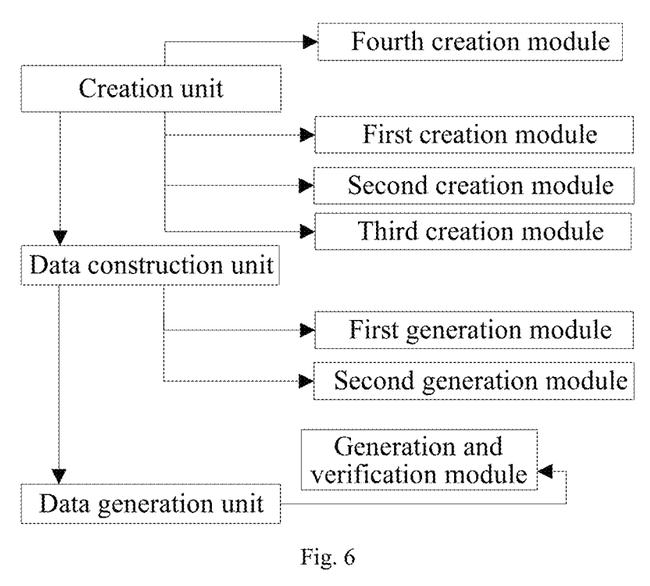
FIG. 6 is a schematic diagram of an architecture of the method according to an embodiment of the present disclosure.

In order to realize the objects above, this application also provides a dynamic stability control system for power systems with renewable energy as shown in FIG. 6.

The dynamic stability control system is applied on the dynamic stability control method, and includes a creation unit, a data construction unit and a data generation unit.

The creation unit is configured for creating the non-linear system of the grid-forming inverter corresponding to the renewable energy power system, and constructing the external subsystem corresponding to the grid-forming inverter based on the Lie derivative.

The data construction unit is configured for constructing the linear sliding surface corresponding to the external subsystem, and generating the dynamic stability control unit corresponding to the external subsystem based on the sliding mode control.

The data generation unit is configured for generating the first instruction data corresponding to the dynamic stability control unit, and controlling the dynamic stability of the renewable energy power system in real time, where the first instruction data is the voltage instruction value data.

In an embodiment, the creation unit includes a first creation module, a second creation module and a third creation module.

The first creation module is configured for creating at least three control loops corresponding to the non-linear system of the grid-forming inverter, where the at least three control loops include the virtual synchronization loop, the current inner loop and the outer loop.

The second creation module is configured for constructing the inner loop current controller corresponding to the inner loop and the outer loop controller corresponding to the outer loop based on the at least three control loops.

The third creation module is configured for respectively selecting and obtaining the voltage reference value data and the power angle variation data corresponding to the grid-forming inverter, and constructing the non-linear SISO model corresponding to the grid-forming inverter.

In an embodiment, the data construction unit further includes a first generation module and a second generation module.

The first generation module is configured for generating the hybrid reaching law corresponding to the linear sliding surface based on the linear sliding surface.

The second generation module is configured for generating the input signal data of the grid-forming inverter corresponding to the non-linear system of the grid-forming inverter according to the hybrid reaching law.

In an embodiment, the control system further includes a generation and verification module. The generation and verification module is configured for generating the fault data corresponding to the renewable energy power system, and verifying the dynamic stability of the renewable energy power system in real time based on the fault data.

The creation unit further includes a fourth creation module. The fourth creation module is configured for constructing the positive sequence and fundamental frequency model corresponding to the non-linear system of the grid-forming inverter. The positive sequence and fundamental frequency model is expressed as:

$$\begin{cases} \dfrac{di_{sd}}{dt} = \dfrac{1}{L_{arm}}(-u_{sd} + v_d + \omega L_{arm} i_{sq} - R_{arm} i_{sd}) \\ \dfrac{di_{sq}}{dt} = \dfrac{1}{L_{arm}}(-u_{sq} + v_q + \omega L_{arm} i_{sd} - R_{arm} i_{sq}) \end{cases} \quad (1)$$

where $v_d$ denotes the d-axis output of the inner loop controller, and $v_q$ denotes the q-axis output of the inner loop controller; $R_{arm}$ denotes the resistance of the bridge arm, and $L_{arm}$ denotes the inductance of the bridge arm; $u_{sd}$ denotes the d-axis component of the bus voltage, and $u_{sq}$ denote the q-axis component of the bus voltage; $i_{sd}$ denotes the d-axis component of the output current of the grid-forming inverter, and $i_{sq}$ denotes the q-axis component of the output current of the grid-forming inverter; and $\omega$ denotes the fundamental frequency of the grid-forming inverter.

In the third creation module, the non-linear SISO model is expressed as:

$$\begin{cases} \dot{x} = f + gu \\ y = h(x) \end{cases}, \quad \begin{cases} x = [\Delta\delta, \Delta\omega, i_{sd}, i_{sq}, M_{id}, M_{iq}, M_{Us}, M_{uq}]^T \\ f = \begin{bmatrix} \omega_0 \Delta\omega \\ -\dfrac{1}{2H_m}\Delta P_s - \dfrac{D_m}{2H_m}\Delta\omega \\ \dfrac{1}{L_{arm}}[-k_{pid}k_{pUs}u_{sd} - (k_{pid} + R_{arm})i_{sd} + M_{id} + k_{pid}M_{Us}] \\ \dfrac{1}{L_{arm}}[-k_{piq}k_{puq}u_{sq} - (k_{piq} + R_{arm})i_{sq} + M_{iq} + k_{piq}M_{uq}] \\ -k_{iid}k_{pUs}u_{sd} - k_{iid}i_{sd} + k_{iid}M_{Us} \\ -k_{iiq}k_{puq}u_{sq} - k_{iiq}i_{sq} + k_{iiq}M_{uq} \\ -k_{iUs}u_{sd} - k_{iUs}U_{sref} \\ -k_{iuq}u_{sq} \end{bmatrix} \\ g = \left[0, 0, \dfrac{k_{pid}K_{pUs}}{L_{arm}}, 0, k_{iid}, k_{pUs}, 0, k_{iUs}, 0\right] \\ h = \Delta\delta \\ u = U_{sref} \end{cases} \quad (2)$$

where $\Delta\omega$ denotes the rotating speed of the grid-forming inverter, and $\Delta\delta$ denotes the power angle variation of the grid-forming inverter; $i_{sd}$ denotes the d-axis component of the output current of the grid-forming inverter, and $i_{sq}$ denotes the q-axis component of the output current of the grid-forming inverter; $M_{id}$ denotes the integral variable of the d-axis part of the inner loop current controller, and $M_{iq}$ denotes the integral variable of the q-axis part of the inner loop current controller; $M_{Us}$ denotes the integral variable of the d-axis part of the outer loop controller, and $M_{uq}$ denotes the integral variable of the q-axis part of the outer loop controller; $\omega_0$ denotes the reference frequency; $H_m$ denotes the inertia coefficient of the grid-forming inverter, and $D_m$ denotes the damping coefficient of the grid-forming inverter; $\Delta P_s$ denotes the power variation of the grid-forming inverter; $R_{arm}$ denotes the resistance of the bridge arm, and $L_{arm}$ denotes the inductance of the bridge arm; $k_{pid}$ denotes the proportional coefficient of the d-axis part of the inner loop current controller, and $k_{iid}$ denotes the integral coefficient of the d-axis part of the inner loop current controller; $k_{piq}$ denotes the proportional coefficient of the q-axis part of the inner loop current controller, and $k_{iiq}$ denotes the integral coefficient of the q-axis part of the inner loop current controller; u denotes the input signal; $U_{sref}$ denotes the bus voltage reference value of the grid-forming inverter; $k_{pUs}$ denotes the proportional coefficient of the d-axis part of the outer loop controller, and $k_{iUs}$ denotes the integral coefficient of the d-axis part of the outer loop controller; $k_{puq}$ denotes the proportional coefficient of the q-axis part of the outer loop controller, and $k_{iuq}$ denotes the integral coefficient of the q-axis part of the outer loop controller; $u_{sd}$ denotes the d-axis component of IBG bus voltage, and $u_{sq}$ denotes the q-axis component of the IBG output voltage; and y denotes the output signal.

In the embodiments of the present disclosure, method steps involved in the dynamic stability control method for the renewable energy power system have specifically described above, that is, function modules of the dynamic stability control system, which are configured for realizing steps or sub-steps in the embodiments of the method, will not described herein.

This application, through the method above, creates the non-linear system of the grid-forming inverter corresponding to the renewable energy power system, and constructs the external subsystem corresponding to the grid-forming inverter based on the Lie derivative; constructs the linear sliding surface corresponding to the grid-forming inverter according to the external subsystem, and generates the dynamic stability control unit corresponding to the grid-forming inverter based on the sliding mode control; and generates and obtains the first instruction data corresponding to the dynamic stability control unit, and controls the dynamic stability of the renewable energy power system in real time according to the first instruction data; where the first instruction data is the voltage instruction value data. In addition, the voltage instruction value of the grid-forming inverter is modified to improve the dynamic stability of the renewable energy power system.

Through technical solutions of the present disclosure, the external subsystem of the renewable energy power system is constructed, and the analytical expression of the inverter voltage control signal is derived based on the sliding mode control method, so as to improve the dynamic stability of the system by modifying the voltage command value of the inverter. In other words, the technical solutions of this application consider dynamic stability problems of the 100% renewable energy power system and provides the method for dynamic stability control of the 100% renewable energy power system, where obtained results can effectively improve the dynamic stability of the 100% renewable energy power system during operation process, promote realization of the power systems with 100% renewable energy, and ensure safe and stable operation of the system.

Described above are only some embodiments of this application, which are specific and detailed, and are not intended to limit this application. It should be noted that various modifications and improvements made by those of ordinary skill in the art without departing the spirit of the present disclosure shall fall within the scope of this application defined by the appended claims.

What is claimed is:

1. A method for dynamic stability control of a renewable energy power system, comprising:
(1) creating a non-linear system of a grid-forming inverter corresponding to the renewable energy power system; and constructing an external subsystem corresponding to the grid-forming inverter based on a Lie derivative;
(2) constructing a linear sliding surface corresponding to the external subsystem; and generating a dynamic stability control unit corresponding to the external subsystem based on sliding mode control; and
(3) generating a first instruction data corresponding to the dynamic stability control unit, and according to the first instruction data, controlling dynamic stability of the renewable energy power system in real time; wherein the first instruction data is a voltage instruction value data.

2. The method of claim 1, wherein in step (1), the non-linear system is created through steps of:
creating at least three control loops corresponding to the non-linear system of the grid-forming inverter, wherein the at least three control loops comprise a virtual synchronization loop, a current inner loop and an outer loop;
constructing an inner loop current controller corresponding to the current inner loop and an outer loop controller corresponding to the outer loop; and
obtaining a voltage reference value data and a power angle variation data corresponding to the grid-forming inverter, and constructing a non-linear single-input single-output (SISO) model corresponding to the grid-forming inverter.

3. The method of claim 1, wherein step (1) further comprises:
constructing a positive sequence and fundamental frequency model corresponding to the non-linear system of the grid-forming inverter, wherein the positive sequence and fundamental frequency model is expressed as:

$$\begin{cases} \dfrac{di_{sd}}{dt} = \dfrac{1}{L_{arm}}(-u_{sd} + v_d + \omega L_{arm} i_{sq} - R_{arm} i_{sd}) \\ \dfrac{di_{sq}}{dt} = \dfrac{1}{L_{arm}}(-u_{sq} + v_q + \omega L_{arm} i_{sd} - R_{arm} i_{sq}) \end{cases} \quad (1)$$

wherein $v_d$ denotes a d-axis output of an inner loop controller, and $v_q$ denotes a q-axis output of the inner loop controller; $R_{arm}$ denotes a resistance of a bridge arm, and $L_{arm}$ denotes an inductance of the bridge arm; $u_{sd}$ denotes a d-axis component of a bus voltage, and $u_{sq}$ denote a q-axis component of the bus voltage; $i_{sd}$ denotes a d-axis component of an output current of the grid-forming inverter, and $i_{sq}$ denotes a q-axis component of the output current of the grid-forming inverter; and $\omega$ denotes a fundamental frequency of the grid-forming inverter.

4. The method of claim 2, wherein the non-linear SISO model is expressed as:

$$\begin{cases} \dot{x} = f + gu \\ y = h(x) \end{cases}, \quad f = \begin{bmatrix} \omega_0 \Delta\omega \\ -\dfrac{1}{2H_m}\Delta P_s - \dfrac{D_m}{2H_m}\Delta\omega \\ \dfrac{1}{L_{arm}}[-k_{pid}k_{pUs}u_{sd} - (k_{pid} + R_{arm})i_{sd} + M_{id} + k_{pid}M_{Us}] \\ \dfrac{1}{L_{arm}}[-k_{pid}k_{puq}u_{sq} - (k_{piq} + R_{arm})i_{sq} + M_{iq} + k_{piq}M_{uq}] \\ -k_{iid}k_{pUs}u_{sd} - k_{iid}i_{sd} + k_{iid}M_{Us} \\ -k_{iiq}k_{puq}u_{sq} - k_{iiq}i_{sq} + k_{iiq}M_{uq} \\ -k_{iUs}u_{sd} - k_{iUs}U_{sref} \\ -k_{iuq}u_{sq} \end{bmatrix}; \quad (2)$$

$$x = [\Delta\delta, \Delta\omega, i_{sd}, i_{sq}, M_{id}, M_{iq}, M_{Us}, M_{uq}]^T$$

$$g = \left[0, 0, \dfrac{k_{pid}K_{pUs}}{L_{arm}}, 0, k_{iid}, k_{pUs}, 0, k_{iUs}, 0\right]$$

$$h = \Delta\delta$$

$$u = U_{sref}$$

wherein $\Delta\omega$ denotes a rotating speed of the grid-forming inverter, and $\Delta\delta$ denotes a power angle variation of the grid-forming inverter; $i_{sd}$ denotes a d-axis component of an output current of the grid-forming inverter, and $i_{sq}$ denotes a q-axis component of the output current of the grid-forming inverter; $M_{id}$ denotes an integral variable of a d-axis part of the inner loop current controller, and $M_{iq}$ denotes an integral variable of a q-axis part of the inner loop current controller; $M_{Us}$ denotes an integral variable of a d-axis part of the outer loop controller, and $M_{uq}$ denotes an integral variable of a q-axis part of the outer loop controller; $\omega_0$ denotes a reference frequency; $H_m$ denotes an inertia coefficient of the grid-forming inverter, and $D_m$ denotes a damping coefficient of the grid-forming inverter; $\Delta P_s$ denotes a power variation of the grid-forming inverter; Ram denotes a resistance of a bridge arm, and $L_{arm}$ denotes an inductance of the bridge arm; $k_{pid}$ denotes a proportional coefficient of the d-axis part of the inner loop current controller, and $k_{iid}$ denotes an integral coefficient of the d-axis part of the inner loop current controller; $k_{piq}$ denotes a proportional coefficient of the q-axis part of the inner loop current controller, and $k_{iiq}$ denotes an integral coefficient of the q-axis part of the inner loop current controller; u denotes an input signal; $U_{sref}$ denotes a bus voltage reference value of the grid-forming inverter; $k_{pus}$ denotes a proportional coefficient of the d-axis part of the outer loop controller, and $k_{iUs}$ denotes an integral coefficient of the d-axis part of the outer loop controller; $k_{puq}$ denotes a proportional coefficient of the q-axis part of the outer loop controller, and $k_{iuq}$ denotes an integral coefficient of the q-axis part of the outer loop controller; $u_{sd}$ denotes a d-axis component of inverter-based generator (IBG) bus voltage, and $u_{sq}$ denotes a q-axis component of the IBG bus voltage; and y denotes an output signal.

5. The method of claim 1, wherein step (2) further comprises:
generating a hybrid reaching law corresponding to the linear sliding surface based on the linear sliding surface; and
according to the hybrid reaching law, generating an input signal data of the grid-forming inverter corresponding to the non-linear system of the grid-forming inverter.

6. The method of claim 1, further comprising:
after step (3), generating a fault data corresponding to the renewable energy power system; and verifying the dynamic stability of the renewable energy power system in real time based on the fault data.

7. A system for implementing the method of claim 1, comprising:
a creation unit;
a data construction unit; and
a data generation unit;
wherein the creation unit is configured for creating the non-linear system of the grid-forming inverter corresponding to the renewable energy power system, and constructing the external subsystem corresponding to the grid-forming inverter based on the Lie derivative;
the data construction unit is configured for constructing the linear sliding surface corresponding to the external subsystem, and generating the dynamic stability control unit corresponding to the external subsystem based on sliding mode control; and
the data generation unit is configured for generating the first instruction data corresponding to the dynamic stability control unit, and controlling the dynamic stability of the renewable energy power system in real time according to the first instruction data; wherein the first instruction data is the voltage instruction value data.

8. The system of claim 7, wherein the creation unit comprises:
a first creation module;
a second creation module; and
a third creation module;
wherein the first creation module is configured for creating at least three control loops corresponding to the non-linear system of the grid-forming inverter; wherein the at least three control loops comprise a virtual synchronization loop, a current inner loop and an outer loop;
the second creation module is configured for constructing an inner loop current controller corresponding to the current inner loop, and an outer loop controller corresponding to the outer loop; and
the third creation module is configured for obtaining a voltage reference value data and a power angle variation data corresponding to the grid-forming inverter, and constructing a non-linear SISO model corresponding to the grid-forming inverter.

9. The system of claim 7, wherein the data construction unit comprises:
a first generation module; and
a second generation module;
wherein the first generation module is configured for generating a hybrid reaching law corresponding to the linear sliding surface based on the linear sliding surface;
the second generation module is configured for generating an input signal data of the grid-forming inverter corresponding to the non-linear system of the grid-forming inverter according to the hybrid reaching law.

10. The system of claim 7, further comprising:
a generation and verification module;
wherein the generation and verification module is configured for generating a fault data corresponding to the renewable energy power system, and verifying the dynamic stability of the renewable energy power system in real time based on the fault data.

11. The system of claim 8, wherein the creation unit further comprises:
a fourth creation module;
wherein the fourth creation module is configured for constructing a positive sequence and fundamental frequency model corresponding to the non-linear system of the grid-forming inverter, wherein the positive sequence and fundamental frequency model is expressed as:

$$\begin{cases} \dfrac{di_{sd}}{dt} = \dfrac{1}{L_{arm}}(-u_{sd} + v_d + \omega L_{arm} i_{sq} - R_{arm} i_{sd}) \\ \dfrac{di_{sq}}{dt} = \dfrac{1}{L_{arm}}(-u_{sq} + v_q + \omega L_{arm} i_{sd} - R_{arm} i_{sq}) \end{cases} \quad (1)$$

wherein $v_d$ denotes a d-axis output of an inner loop controller, and $v_q$ denotes a q-axis output of the inner loop controller; $R_{arm}$ denotes a resistance of a bridge arm, and $L_{arm}$ denotes an inductance of the bridge arm; $u_{sd}$ denotes a d-axis component of a bus voltage, and $u_{sq}$ denote a q-axis component of the bus voltage; $i_{sd}$ denotes a d-axis component of an output current of the grid-forming inverter, and $i_{sq}$ denotes a q-axis component of the output current of the grid-forming inverter; and $\omega$ denotes a fundamental frequency of the grid-forming inverter.

12. The system of claim 8, wherein the non-linear SISO model is expressed as:

$$\begin{cases} \dot{x} = f + gu \\ y = h(x) \end{cases}, \quad \begin{cases} x = [\Delta\delta, \Delta\omega, i_{sd}, i_{sq}, M_{id}, M_{iq}, M_{Us}, M_{uq}]^T \\ f = \begin{bmatrix} \omega_0 \Delta\omega \\ -\dfrac{1}{2H_m}\Delta P_s - \dfrac{D_m}{2H_m}\Delta\omega \\ \dfrac{1}{L_{arm}}[-k_{pid}k_{pUs}u_{sd} - (k_{pid} + R_{arm})i_{sd} + M_{id} + k_{pid}M_{Us}] \\ \dfrac{1}{L_{arm}}[-k_{pid}k_{puq}u_{sq} - (k_{piq} + R_{arm})i_{sq} + M_{iq} + k_{piq}M_{uq}] \\ -k_{iid}k_{pUs}u_{sd} - k_{iid}i_{sd} + k_{iid}M_{Us} \\ -k_{iiq}k_{puq}u_{sq} - k_{iiq}i_{sq} + k_{iiq}M_{uq} \\ -k_{iUs}u_{sd} - k_{iUs}U_{sref} \\ -k_{iuq}u_{sq} \end{bmatrix} \\ g = \left[0, 0, \dfrac{k_{pid}K_{pUs}}{L_{arm}}, 0, k_{iid}, k_{pUs}, 0, k_{iUs}, 0\right] \\ h = \Delta\delta \\ u = U_{sref} \end{cases} \quad (2)$$

wherein $\Delta\omega$ denotes a rotating speed of the grid-forming inverter, and $\Delta\delta$ denotes a power angle variation of the grid-forming inverter; $i_{sd}$ denotes a d-axis component of an output current of the grid-forming inverter, and $i_{sq}$ denotes a q-axis component of the output current of the grid-forming inverter; $M_{id}$ denotes an integral variable of a d-axis part of the inner loop current controller, and $M_{iq}$ denotes an integral variable of a q-axis part of the inner loop current controller; $M_{Us}$ denotes an integral variable of a d-axis part of the outer loop controller, and $M_{uq}$ denotes an integral variable of a q-axis part of the outer loop controller; $\omega_0$ denotes a reference frequency; $H_m$ denotes an inertia coefficient of the grid-forming inverter, and $D_m$ denotes a damping coefficient of the grid-forming inverter; $\Delta P_s$ denotes a power variation of the grid-forming inverter; $R_{arm}$ denotes the resistance of the bridge arm, and $L_{arm}$ denotes the inductance of the bridge arm; $k_{pid}$ denotes a proportional coefficient of the d-axis part of the inner loop current controller, and $k_{iid}$ denotes an integral coefficient of the d-axis part of the inner loop current controller; $k_{piq}$ denotes a proportional coefficient of the q-axis part of the inner loop current controller, and $k_{iiq}$ denotes an integral coefficient of the q-axis part of the inner loop current controller; u denotes an input signal; $U_{sref}$ denotes a bus voltage reference value of the grid-forming inverter; $k_{pus}$ denotes a proportional coefficient of the d-axis part of the outer loop controller, and $k_{iUs}$ denotes an integral coefficient of the d-axis part of the outer loop controller; $k_{puq}$ denotes a proportional coefficient of the q-axis part of the outer loop controller, and $k_{iuq}$ denotes an integral coefficient of the q-axis part of the outer loop controller; $u_{sd}$ denotes a d-axis component of inverter-based generation (IBG) bus voltage, and $u_{sq}$ denotes a q-axis component of the IBG output voltage; and y denotes an output signal.

\* \* \* \* \*